United States Patent Office 3,658,786
Patented Apr. 25, 1972

3,658,786
BRANCHED CHAIN RIBOFURANOSYL
NUCLEOSIDES AND INTERMEDIATES
Hans Albrecht, Mountain View, and John G. Moffatt,
Los Altos, Calif., assignors to Syntex Corporation,
Panama, Panama
No Drawing. Filed June 27, 1969, Ser. No. 837,307
Int. Cl. C07c 47/18; C07d 51/52, 51/54
U.S. Cl. 260—210 R                                   18 Claims

ABSTRACT OF THE DISCLOSURE

The 3' - acylamidomethyl-3'-deoxy-β-D-ribofuranosyl nucleosides have antimicrobial activity and can be used to control metabolic processes in biological systems. Intermediates and processes for preparing these compounds are also described.

---

This invention relates to 3'-acylamidomethyl-3'-deoxy-β-D-ribofuranosyl nucleosides and intermediates therefor.

Prior to this invention, ribofuranosides having acylamidomethyl, aminomethyl or nitromethyl branched chains at the 3'-position and methods for preparing them were not known. This invention provides compounds of these types together with processes for preparing them.

In summary, the 3'-acylamidomethyl-3'-deoxy-β-D-ribofuranosyl nucleosides of this invention can be represented by the following formula:

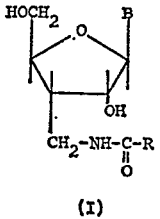

(I)

In the above formula:

is an acyl group of a natural amino acid, and
B is a pyrimidine or purine base or a conventional hydrolyzable acyl derivative thereof.

In summary, novel intermediate compounds of this invention can be represented as follows:

Compounds of the formula

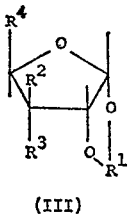

(III)

wherein $R^1$ is an alkylidene group having from 1 to 8 carbons or a cycloalkylidene group having up to 8 carbons, preferably from 5 to 8 carbons such as a cyclohexylidene group;

one of $R^2$ and $R^3$ is hydroxy and the other is nitromethyl;
$R^4$ is

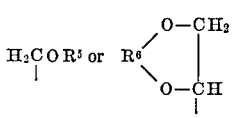

wherein $R^5$ is a conventional hydrolyzable acyl group and $R^6$ is an alkylidene group having from 1 to 8 carbons or a cycloalkylidene group having up to 8 carbons, preferably from 5 to 8 carbons such as a cyclohexylidene group;

Compounds of the formula:

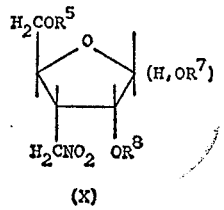

(X)

wherein $R^5$ is as previously defined;
$R^7$ and $R^8$ both are lower aliphatic hydrocarbon acyl groups; and Compounds of the formula:

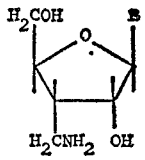

(XVI)

wherein B is as previously defined.

The term "pyrimidine based," as used herein, refers to an unsubstituted or substituted pyrimidine or 6-azapyrimidine group wherein the point of attachment to the sugar unit is through the 1-position of the pyrimidine group. The term "purine base," as used herein, refers to an unsubstituted or substituted purine, 7-deazapurine or 8-azapurine group wherein the point of attachment to the sugar unit is through the 9-position of the purine group. Thus, the term "pyrimidine or purine base" is inclusive of nitrogen analogs, i.e., members of the 6-azapyrimidine, 7-deazapurine and 8-azapurine series.

More specifically, the pyrimidine and purine bases include uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthin-9-yl, 7-deazaadenin-9-yl, 7-deazaguanin-9-yl, adenin-9-yl, 6-chloropurin-9-yl, 6-mercaptopurin-9-yl, 6-methylmercaptopurin - 9 - yl, guanin-9-yl, xanthin-9-yl, 2,6-dichloropurin-9-yl, 2,6-dimethylaminopurin-9-yl, 2,6-diaminopurin-9-yl, 8-azaadenin - 9 - yl, thioguanin-9-yl, 2-fluoroadenin-9-yl, 6-hydroxyaminopurin-9-yl, 2-amino-6-methylmercaptopurin-9-yl, 8-azaguanin-9-yl, and 6-substituted purin-9-yl compounds which can be represented by the formula

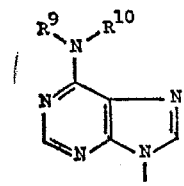

In the above formula, $R^9$ and $R^{10}$ each is hydrogen, lower alkyl, or 3″,3″-dimethylallyl, or $R^9$ and $R^{10}$ together are —$(CH_2)_n$— wherein $n$ is an integer of from 2 to 6 or $R^9$ and $R^{10}$ together with the nitrogen to which they are attached are morpholino. Examples of such groups are 6-aminopurin-9-yl,
6-methylaminopurin-9-yl,
6-dimethylaminopurin-9-yl,
6-diethylaminopurin-9-yl,
6-di(n-propyl)aminopurin-9-yl,
6-(3,3-dimethylallyl)aminopurin-9-yl,
6-morpholinopurin-9-yl,
6-piperidinopurin-9-yl,
6-ethylenaminopurin-9-yl,
6-trimethylenaminopurin-9-yl,
6-tetramethyleneaminopurin-9-yl, and the like.

The term "hydrolyzable ester groups" and "hydrolyzable acyl groups," as used herein, refer to those esters and acyl derivatives conventionally employed in the nucleoside and nucleotide art, preferably those derived from carboxylic acids of 1 to 12 carbon atoms. Typical conventional hydrolyzable acyl groups thus include acetyl, propionyl, butyryl, valeryl, isovaleryl, hexanolyl, heptanoyl, octanoyl, nonanoyl, undecanoyl, lauroyl, benzoyl, phenylacetyl, phenylpropionyl, o-, m- or p-methoxylbenzoyl, β-cyclopentylpropionyl, and the like. The term "lower aliphatic hydrocarbon acyl group" refers to aliphatic carboxylic acids having from 1 to 6 carbons such as the respective groups listed above.

The term "alkylidene group having from 1 to 8 carbons" includes methylene, ethylidene, propylidene, isopropylidene, n-butylidene, n-pentylidene, n-octylidene, and the like. The term "cycloalkylidene" includes cyclopropylidene, cyclobutylidene, cyclopentylidene, cyclohexylidene, cycloheptylidene, cyclooctylidene, and the corresponding alkyl substituted compounds having up to 8 carbons, preferably from 5 to 8 carbons.

The following representation at the 1-position

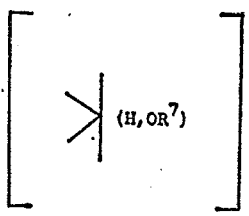

denotes compounds having both an α-H, β-$OR^7$ and a β-H, α-$OR^7$ configurations at the 1-position. When this representation is used with other groups, the same orientation is intended.

The compounds of this invention and in particular compounds of Formulas I and XVI exhibit anti-metabolic properties and are accordingly useful in producing metabolic deficiencies in biological systems as, for example, in the growth of various microorganisms such as trypanosomes and other undesirable systems.

Valuable intermediate compounds of this invention such as certain of the compounds of Formula III and the compounds of Formula X are prepared by a process which can be represented as follows:

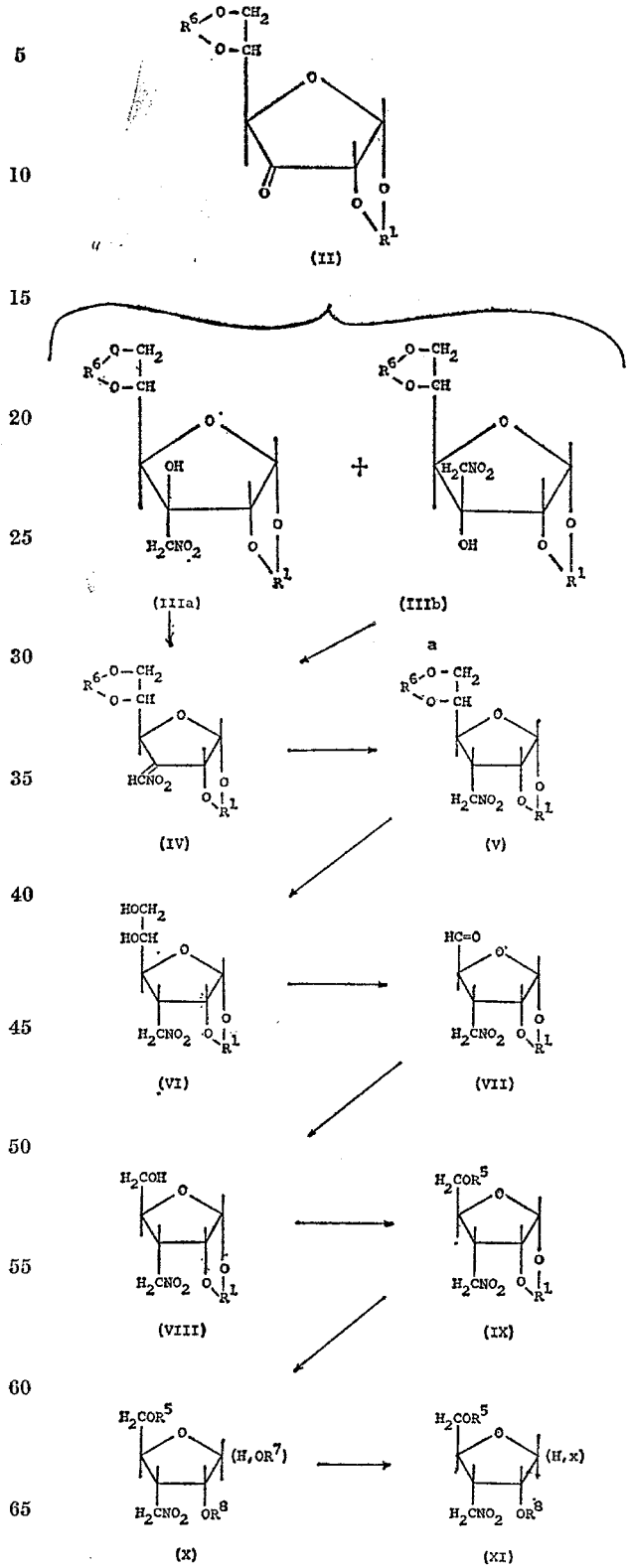

In the above formulas, $R^1$, $R^5$, $R^6$, $R^7$ and $R^8$ are as previously defined; and $x$ is bromo or chloro.

The 1,2:5,6-di-O-alkylidene-α-D-ribo-hexofuranose - 3-ulose of Formula II, when reacted with nitromethane in the presence of a base such as potassium t-butoxide in dimethylformamide, yields a mixture of the compounds of Formula IIIa and the compounds of Formula IIIb. The latter compounds are dehydrated with acetic anhydried in dimethyl sulfoxide to yield the corresponding 3-dehydro-3-deoxy - 3 - nitromethylene compounds of Formula IV. Hydrogenation of the nitromethylene group with sodium borohydride in ethanol yields the corresponding 3-deoxy-3-nitromethyl compounds of Formula V. The 5,6-di-O-alkylidene group is then cleaved by careful treatment with dilute hydrochloric acid in methanol to yield the compounds of Formula VI. These are treated with sodium periodate in a water-methanol solution to yield the compounds of Formula VII which are reduced with sodium borohydride in 50 percent aqueous ethanol to yield the compounds of Formula VIII. The latter compounds, when esterified with the desired acyl halide in pyridine, yield the corresponding 5-O-acyl compounds of Formula IX. Reaction of the latter compounds with an aliphatic carboxylic acid anhydride in acetic acid in the presence of concentrated sulfuric acid yields the intermediate compounds of this invention represented by Formula X. The halides of Formula XI are prepared by treating the esters of Formula X with a dry ether solution saturated with anhydrous hydrogen chloride (at about 0° C. for about 6 days) or hydrogen bromide (at about 20° C. for from 1 to 8 hours) to yield the corresponding 1-deoxy-1-halo compounds of Formula XI.

A procedure for preparing other compounds of Formula III and the compounds of Formula IX can be represented as follows:

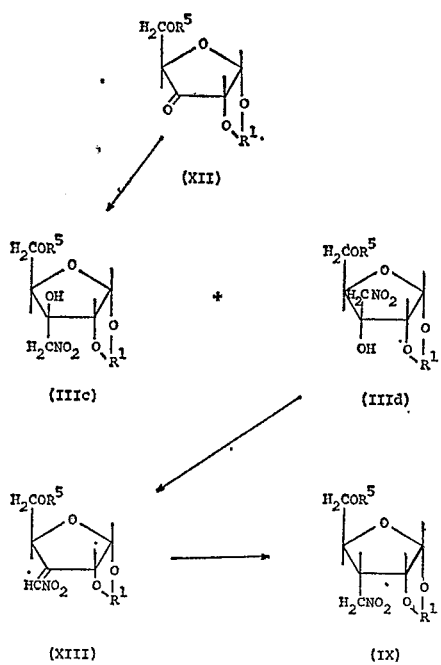

In the above formulas, $R^1$ and $R^5$ are as previously defined.

By reacting the 5-O-acyl-1,2-O-isopropylidene - α - D-erythropentofuranose-3-ulose of Formula XII in a dimethylformamide solution of nitromethane and potassium t-butoxide (which react in situ to form the potassium salt of nitromethane), the compounds of Formula IIIc and IIId are obtained. These are dehydrated by treatment with acetic anhydride in dimethyl sulfoxide to yield the nitromethylene compounds of Formula XIII. The latter compounds when reduced with sodium borohydride in aqueous ethanol yield the corresponding 3-deoxy-3-nitromethyl compounds of Formula IX.

The novel intermediate compounds of this invention represented by Formula XVI are prepared from the compounds of Formula XI by a procedure represented as follows:

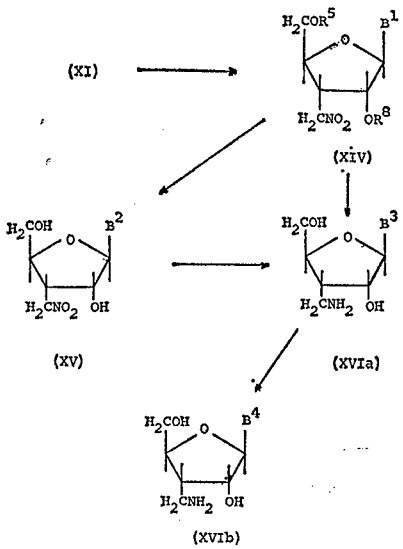

In the above formulas,
$R^8$ is as previously defined:
$B^1$ is uracil-1-yl,
$N^4$-acetylcytosin-1-yl,
5-bromouracil-1-yl,
$N^4$-acetyl-5-bromocytosin-1-yl,
5-chlorouracil-1-yl,
$N^4$-acetyl-5-chlorocytosin-1-yl,
5-iodouracil-1-yl,
$N^4$-acetyl-5-iodocytosin-1-yl,
5-fluorouracil-1-yl,
$N^4$-acetyl-5-fluorocytosin-1-yl,
thymin-1-yl,
$N^4$-acetyl-5-methylcytosin-1-yl,
5-trifluoromethyluracil-1-yl,
$N^4$-acetyl-5-trifluoromethylcytosin-1-yl,
5-hydroxyuracil-1-yl,
6-azauracil-1-yl,
$N^4$-acetyl-6-azacytosin-1-yl,
6-azathymin-1-yl,
hypoxanthin-9-yl,
$N^6$-benzoyl-7-deazaadenin-9-yl,
$N^2$-acetyl-7-deazaguanin-9-yl,
$N^6$-benzoyladenin-9-yl,
6-chloropurin-9-yl,
$N^2$-acetylguanin-9-yl,
xanthin-9-yl,
2,6-dichloropurin-9-yl,
$N^6$-benzoyl-8-azaadenin-9-yl,
$N^6$-benzoyl-2-fluoroadenin-9-yl,
$N^2$-acetyl-8-azaguanin-9-yl,
$N^2$-acetamido-6-chloropurin, and
2,6-benzamidopurin-9-yl;

$B^2$ is 5-aminouracil-1-yl, 5-aminocytosin-1-yl, 5-methylaminouracil-1-yl, 5-methylaminocytosin-1-yl, 2,6-dimethylaminopurin-9-yl, or a 6-substituted purin-9-yl compound which can be represented by the formula:

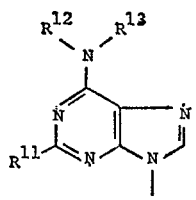

wherein

R[11] is hydrogen or methylamino but is methylamino only when the group at the 6-position

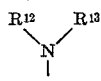

is methylamino

R[12] and R[13] each represents hydrogen, lower alkyl or 3'', 3''-dimethylallyl or R[12] and R[13] togeher are

wherein $n$ is an integer of from 2 to 6 or R[12] and R[13] together with the nitrogen to which they are attached are morpholino, but only one of R[12] and R[13] can be hydrogen;

B[3] represents the deacylated pyrimidine and purine bases listed above with respect to B[1] and B[2]; and B[4] is 6-hydroxyaminopurin, 6-mercaptopurin-9-yl, 6-methylmercaptopurin-9-yl, thioguanin-9-yl, and 2-amino-6-methylmercaptopurin-9-yl.

The pyrimidine compounds of Formula XIV are prepared by reacting the halo compounds of Formula XI with trimethylsilyl derivatives of pyrimidine bases in which any amino substituents are first protected by acylation. The trimethylsilyl derivatives are known in the art, and procedures for their preparation are described in Chem. Pharm. Bull., Japan, 12, 352 (1964). The reaction is carried out in an inert organic solvent such as benzene, toluene, xylene or preferably nitromethane at temperatures of from 20 to 100° C. for from 1 to 48 hours to yield the pyrimidine nucleosides of Formula XIV.

The purine compounds of Formula XIV are prepared by reacting the halo compounds of Formula XI with known mercury derivatives of purine bases prepared, for example, as described in J. Amer. Chem. Soc. 73, 1650 (1951). These mercury derivatives (sometimes described as the mercury salt or mercuric chloride salt of the bases) are usually prepared by reacting mercuric chloride with a suitably protected purine base in the presence of potassium or sodium hydroxide. An anhydrous solution of the purine base mercury compounds (the base being suitably protected if necessary) and the compounds of Formula XI can be reacted in an alkyl substituted benzene solvent such as xylene or toluene for from 15 minutes to 3 hours at reflux conditions. Preferably, the reaction is carried out in a solvent such as nitromethane at a temperature of 15° C. up to reflux conditions. The time required for carrying out the reaction depends upon the reaction temperature. At the lower temperatures, reaction times of from 8 hours up to several days may be required. At higher temperatures such as reflux temperatures, reaction times of from 15 minutes to 4 hours are usually sufficient. With mercury salts of some bases, the yield is improved by refluxing.

The 6-substituted-amino purine and 2,6-dimethylaminopurine compounds of Formula XV are obtained by reacting the respective 6-chloropurine or 2,6-dichloropurine compounds of Formula XIV with the respective amine reactant in a polar solvent such as alcohol or water at a temperature within the range of from 20 to 100° C. for from 4 to 24 hours. Aqueous dimethylamine reacts at room temperature in one hour. Other amines are preferably reacted in non-aqueous solvents as elevated temperatures and under pressure, if required. The 5-aminouracil, 5-aminocytosin, 5-methylaminouracil and 5-methylaminocytosine compounds of Formula XV are prepared by reacting the corresponding 5-bromouracil or N[4]-acetyl-5-bromocytosine with anhydrous ammonia or methylamine at 60 to 100° C. for 4 to 24 hours under pressure.

The compounds of Formula XVIa are prepared by hydrogenating the deacylated compounds of Formula XIV and the compounds of Formula XV in methanol in the presence of a prereduced 10 percent palladium on inert support carrier catalyst such as palladium-on-charcoal, palladium-on-barium sulfate or palladium-on-calcium carbonate to yield the corresponding 3-deoxy-3-aminomethyl compounds. The compounds of Formula XIV are deacylated by treatment with concentrated ammonium hydroxide.

The 6-mercaptopurine and thioguanine compounds of Formula XVIb can be prepared by reacting the corresponding 6 - chloropurine and 2-amino-6-chloropurine compounds of Formula XVIa with thiourea in absolute ethanol at reflux for about 1 hour. The 6-methylmercaptopurine and 2-amino-6-methylmercaptopurine compounds of Formula XVIb are prepared by reacting the corresponding mercapto compounds with methyl iodide in absolute ethanol at room temperature for about 4 hours while a dilute methanolic sodium hydroxide solution is added to maintain a pH of about 8.

The 6 - hydroxyaminopurine compounds of Formula XVIb are prepared by reacting the corresponding 6-chloropurine compounds of Formula XVIa with hydroxylamine in ethanol at a temperature of 50° C. for 2 to 12 hours.

The 3' - acylamidomethyl-3'-deoxy-$\beta$-D-ribofuranosyl nucleosides of Formula I are prepared by a procedure which can be represented as follows:

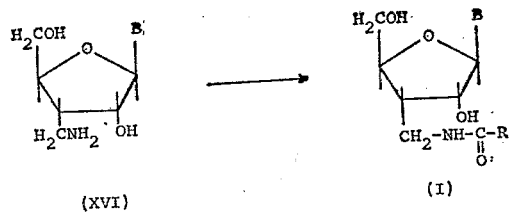

In the above formulas,

R and B are as previously defined.

The compounds of Formula I wherein B and R are free from sulfur are prepared from the compounds of Formula XVI by adding a solution of the compounds of Formula XVI in dimethylformamide containing triethylamine to a prepared solution containing the suitably protected amino acid, triethylamine and ethyl chloroformate in dimethylformamide. The reaction mixture is maintained free from moisture for 24 hours. The carbobenzoxy group is then removed by treatment with a 10 percent prereduced palladium-on-carbon catalyst in methanol to yield the compounds of Formula I.

Alternatively, when B or R contains sulfur, the compounds of Formula XVI are preferably reacted with the N-hydroxysuccinimide ester of the appropriate N-(tert-butoxycarbonyl)-amino acid in the presence of sodium bicarbonate in aqueous ethanol solution. The tert-butoxycarbonyl group is then removed by treatment with trifluoroacetic acid at room temperature for about 1 hour.

The protected amino acid reactants are all readily available, well known compounds.

PREPARATION

The bis(trimethylsilyl)pyrimidine bases are prepared by the following procedure:

N-acetylcytosine (3.0 g.) is suspended in 50 ml. of dry benzene containing 6.0 g. of trimethylchlorosilane, and 4.5 g. of triethylamine is added. The mixture is stirred for 48 hours at 20° C. and the triethylamine hydrochloride is filtered in a dry box and rinsed with dry benzene. The filtrate is evaporated to dryness and thoroughly dried. The residue is distilled under high vacuum ($10^{-2}$ mm. Hg, 60° C.) to yield 3.5 g. of crystalline N[4]-acetyl-bis(trimethylsilyl)-cytosine.

Repeating this procedure using other pyrimidine bases with any primary amino groups suitably protected with an acyl group yields the corresponding bis(trimethylsilyl)-pyrimidine bases.

EXAMPLE 1

1,2:5,6 - di-O-isopropylidene - 3-nitromethyl-α-D-glucofuranose and 1,2:5,6-di-O-isopropylidene - 3 - nitromethyl-α-D-allofuranose To 19.0 g. (0.17 mole) of potassium tertiary butylate in 300 ml. of ice-cooled DMF are added 15.2 g. (0.25 mole) of nitromethane with stirring. A thick precipitate consisting of the potassium salt of nitromethane forms immediately, and 46.0 g. (0.178 mole) 1,2:5,6-di-O-isopropylidene-α-D-ribo-hexofuranos - 3-ulose dissolved in 100 ml. DMF is added slowly under efficient stirring. Near the end of the addition, a homogeneous solution results which is kept for 30 minutes at 0° C. and then for one hour at room temperautre. The reaction mixture is neutralized with acetic acid and partitioned between ethyl acetate (1000 ml.) and water (200 ml.). The organic layer is washed with saturated aqueous $NaHCO_3$ (2× 100 ml.) and water (2× 100 ml.), dried over magnesium sulfate and evaporated to dryness. The residue is dissolved in a small amount of chloroform; after addition of hexane, crystallization occurs to give a mixture of 1,2:5,6-di-O-isopropylidene - 3 - nitromethyl-α-D-glucofuranose and 1,2:5,6 - di-O-isopropylidene-3-nitromethyl-α-D-allofuranose which can be separated by chromatography on silicic acid followed by recrystalization.

13.8 grams of this mixture is dissolved in chloroform and precipitated with hexane to yield 1,2:5,6-D-O-isopropylidene-3-nitromethyl-α-D-glucofuranose.

300 milligrams of the mixture is separated on preparative thin layer chromatography (ethyl acetate-chloroform 2:10; detection with "hot-wire-method"). The faster moving band is eluted, evaporated to dryness, and recrystallized from chloroform-hexane to give 1,2:5,6-di-O-isopropylidene-3-nitromethyl-α-D-allofuranose.

EXAMPLE 2

3-dehydro-3-deoxy-1,2:5,6-di-O-isopropylidene-3-nitromethylene-α-D-ribo-hexofuranose 55.0 grams (0.173 mole) of the mixture of nitroalcohols from Example 1 are dissolved in 1500 ml. of DMSO/acetic anhydride (2:1) and kept for 24 hours. After evaporation in a high vacuum at 50° C., 60.0 g. of a dark yellow syrup containing 3 - dehydro-3-deoxy-1,2:5,6 - di-O-isopropylidene-3-nitromethylene-α-D-ribohexofuranose contaminated with smal amounts of DMSO is left. This can be used without further purification for the next step, or it can be purified by high vacuum distillation or conventional chromatography.

EXAMPLE 3

3-deoxy-1,2:5,6-di-O-isopropylidene-3-nitromethyl-α-D-allofuranose

To an ice-cooled, well stirred suspension of 20.0 g. of sodium borohydride in 1000 ml. of ethanol is slowly added a solution of the product of Example 2 (48.0 g.) in ethanol. The reaction mixture is kept for 1.5 hours at room temperature and neutralized with acetic acid. After evaporation, the residue is partitioned between chloroform (1500 ml.) and water (300 ml.). The chloroform layer is washed with aqueous saturated sodium bicarbonate (200 ml.) and water (2× 100 ml.), dried and evaporated to dryness. The residue is dissolved in warm methanol (500 ml.), and upon addition of water (about 800 ml.), crystalline 3-deoxy-1,2:5,6-di-O-isopropylidene-3-nitromethyl-α-D-allofuranose separates.

EXAMPLE 4

3-deoxy-1,2:5,6-di-O-isopropylidene-3-methylamino-α-D-allofuranose hydroacetate 500 milligrams (1.6 mmoles) of the product of Example 3 is dissolved in 60 ml. of aqueous methanol and hydrogenated over Raney-nickel. The hydrogenation is complete after four hours; the catalyst is filtered off, washed well with methanol, and the combined filtrates are evaporated to a syrup. Addition of 1.5 equivalents of acetic acid and removal of excess acetic acid by evaporation yields 3 - deoxy - 1,2:5,6 - di - O - isopropylidene- 3 - methylamino - α - D - allofuranose hydroacetate as a syrup which is crystallized by dissolving it in ethyl acetate and adding hexane to give fine needles of the product.

EXAMPLE 5

3-deoxy-3-nitromethyl-1,2-O-isopropylidene-α-D-allofuranose 40.0 grams (0.13 mmoles) of the product of Example 3 is dissolved in methanol (1500 ml.), and 0.4 percent aqueous hydrochloric acid (500 ml.) is added. Thin layer chromatography (ethyl acetate-methanol 10:1) shows hydrolysis to be nearly complete after 45 hours. The reaction mixture is neutralized with aqueous sodium bicarbonate and evaporated to a smaller volume (200 ml.). Unreacted starting material is filtered off, and the aqueous solution is extracted with hexane (3× 500 ml.) and with ethyl acetate (3× 1000 ml.). The ethyl acetate solutions are combined, dried and evaporated to a syrup which crystallizes after adding seed crystals to give 3-deoxy-3-nitromethyl-1,2-O-isopropylidene-α-D-allofuranose.

Seed crystals can be obtained from a sample which after distillation in a "kugelrohr," is kept for 3 weeks at room temperature to effect crystallization.

EXAMPLE 6

3-deoxy-1,2-O-isopropylidene-3-nitromethyl-α-D-ribofuranose 23.0 grams (87 mmoles) of the product of Example 5 dissolved in methanol (200 ml.) is added to an ice-cooled solution of 19.0 g. (89 mmoles) of sodium periodate in water (250 ml.). After two hours at room temperature, excess oxidizing reagent is destroyed by adding a few drops of ethylene glycol. Addition of methanol (800 ml.) precipitates $NaIO_3$. The filtrate is evaporated to dryness, taken up in ethanol (300 ml.), filtered and added to an ice-cooled, well stirred mixture of 9.5 g. of sodium borohydride in 50 percent aqueous ethanol (600 ml.). The reaction mixture is kept for two hours at room temperature, neutralized with acetic acid and evaporated. The residue is partitioned between water (300 ml.) and chloroform (1000 ml.). The organic layer is washed with saturated aqueous sodium bicarbonate (150 ml.) and water (2× 100 ml.), dried and evaporated to yield 3-deoxy - 1,2 - O - isopropylidene - 3 - nitromethyl - α-D-ribofuranose.

EXAMPLE 7

3-deoxy-1,2-O-isopropylidene-5-O-(p-nitrobenzoyl)-3-nitromethyl-α-D-ribofuranose To a solution of the product of Example 6 (4.66 g., 20 mmoles) in pyridine (150 ml.) is added dropwise with stirring at 0° C. p-nitrobenzoyl chloride (4.1 g., 23 mmoles) dissolved in pyridine (100 ml.). After one hour at room temperature, ice and saturated aqueous sodium bicarbonate are added, followed by extraction with chloroform (800 ml.). The chloroform layer is washed with saturated aqueous sodium bicarbonate (100 ml.) and water (2× 100 ml.), and evaporated. After coevaporation with toluene to remove last traces of pyridine, the residue crystallizes slowly. Recrystallization from ether-hexane gives 3 - deoxy - 1,2 - O - isopropylidene - 5 - O-(p-nitrobenzoyl)-3-nitromethyl-α-D-ribofuranose.

EXAMPLE 8

1,2-di-O-acetyl-3-deoxy-5-O-(p-nitrobenzoyl)-3-nitromethyl-β-D-ribofuranose and its α-anomer The product of Example 7 (11.0 g., 29 mmoles) is dissolved in an ice-cooled mixture of acetic anhydride and acetic acid (100 ml. 1:1) containing 2 ml. of concentrated sulfuric acid. The reaction mixture is kept overnight at room temperature and then poured with stirring into ice-water (100 ml.). Saturated aqueous sodium bicarbonate is added to bring the pH to 2–3. A precipitate forms which is filtered off and redissolved in chloroform (500 ml.). The chloroform solution is washed with saturated aqueous sodium bicarbonate (2× 100 ml.) and water (2× 100 ml.), dried and evaporated to a syrup, which crystallizes after standing overnight to yield a mixture of 1,2 - di - O - acetyl - 3 - deoxy - 5 - O - (p-nitrobenzoyl) - 3 - nitromethyl - β - D - ribofuranose and 1,2 - di - O - acetyl - 3 - deoxy - 5 O -(p - nitrobenzoyl)-3-nitromethyl-α-D-ribofuranose.

By chromatography through a silica gel column (300 g.), eluting with $CCL_4$-acetone 6:1, pure 1,2 - di - O-acetyl - 5 - O - (p - nitrobenzoyl) - 3 - nitromethyl - α - D-ribofuranose and pure 1,2 - di - O - acetyl - 3 - deoxy-5 - O - (p - nitrobenzoyl) - 3 - nitromethyl - β - D - ribofuranose are obtained.

EXAMPLE 9

5-O-benzoyl-1,2-O-isopropylidene-3-nitromethyl-α-D-ribofuranose 1.02 grams (3.5 mmoles) of 5 - O - benzoyl - 1,2-O - isopropylidene - α - D - erythro - pentofuranose-3-ulose in 10 ml. of DMF are added to an ice-cooled well stirred suspension of the potassium salt of nitromethane (generated from potassium tertiary butylate (335 mg., 3 mmoles)) and nitromethane 425 mg., 7 mmoles) in DMF (20 ml.). The reaction mixture is kept for 30 minutes at room temperature, neutralized with acetic acid, and partitioned between ethyl acetate (300 ml.) and water (50 ml.). The organic layer is washed with aqueous sodium bicarbonate (50 ml.) and water (50 ml.), dried over magnesium sulfate, and evaporated to a syrup containing a mixture of 5 - O - benzoyl - 1,2 - O - isopropylidene - 3 - nitromethyl - α - D - ribofuranose and 5-O-benzoyl - 1,2 - O - isopropylidene - 3 - nitromethyl - α-D-xylofuranose. After addition of ether, 5 - O - benzoyl-1,2 - O - isopropylidene - 3 - nitromethyl - α - D - ribofuranose is crystallized.

EXAMPLE 10

5-O-benzoyl-3-dehydro-3-deoxy-1,2,-O-isopropylidene-3-nitromethylene-α-D-erythro-pentofuranose The product of Example 9 (353 mg., 1 mmole) is dissolved in dimethyl sulfoxide-acetic anhydride (30 ml., 2:1) and kept for 24 hours at room temperature. After evaporation, 420 mg. of 5 - O - benzoyl - 3 - dehydro-3 - deoxy - 1,2 - O - isopropylidene - 3 - nitromethylene-α - D - erythro - pentofuranose containing some dimethyl sulfoxide is left.

EXAMPLE 11

5-O-benzoyl-3-deoxy-1,2,O-isopropylidene-3-nitromethyl-α-D-ribofuranose

The product of Example 10 (420 mg.) is added to a suspension of 1.1 g. of sodium borohydride in 50 ml. of aqueous ethanol with stirring. The reaction is kept at room temperature for 1 hour, neutralized with acetic acid and evaporated. The residue is partitioned between ethyl acetate (300 ml.) and $H_2O$ (50 ml.). The organic layer is washed with aqueous sodium bicarbonate (50 ml.) and water (50 ml.), dried, and evaporated to give 5-O-benzoyl-3-deoxy-1,2-O-isopropylidene - 3 - nitromethyl - α - D-ribofuranose.

EXAMPLE 12

2-O-acetyl-3-deoxy-5-O-(p-nitrobenzoyl)-3-nitromethyl-D-ribofuranosyl chloride

A pure isomer or the mixture of isomers produced in Example 8 (1.5 g., 3.5 mmoles) is suspended in ether (100 ml.), and anhydrous hydrogen chloride is passed through at 0° C. with exclusion of moisture until the solvent is saturated. At this point the starting material is dissolved slowly, and the solution is kept for 3 days at 0° C. Evaporation followed by coevaporation with benzene to remove last traces of hydrogen chloride gives 2-O-acetyl-3-deoxy-5-O-(p-nitrobenzoyl)-3-nitromethyl - D - ribofuranosyl chloride as a solid residue which is dissolved in dichloromethane (50 ml.) for the next step.

EXAMPLE 13

9-[2-O-acetyl-3-deoxy-5-O-(p-nitrobenzoyl)-3-nitromethyl-β-D-ribofuranosyl]-6-chloropurine A solution of the product of Example 12 in dichloromethane (50 ml., 3.5 mmoles) is added dropwise to a well stirred, azeotropically dried suspension of chloromercury-6-chloropurine (1.2 g.) in toluene (100 ml.) in a 3-necked flask equipped with dropping funnel, take-off adaptor and reflux condenser.

During the addition of the ribofuranosyl chloride, the bath temperature is gradually brought from 80 to 130° C., and dichloromethane and part of the toluene (50 ml.) is removed by means of a take-off adaptor. The suspension is refluxed under efficient stirring for two hours (bath temperature 130–140° C.) and cooled down to room temperature. The organic material is extracted with chloroform (300 ml.) and separated from the inorganic material by centrifugation. The residue is again treated carefully with chloroform, and the combined chloroform solutions are washed successively with 100 ml. portions of 30 percent aqueous potassium iodide, saturated aqueous sodium chloride, and water, are dried over magnesium sulfate and evaporated to dryness. Purification by preparative thin layer chromatography on silica gel (acetone-chloroform 1:2) gives 9-[2-O-acetyl-3-deoxy-5-O-(p-nitrobenzoyl)-3-nitromethyl-β-D-ribofuranosyl]-6-chloropurine.

EXAMPLE 14

Other 9-[2-O-acetyl-3-deoxy-5-O-(p-nitrobenzoyl)-3-nitromethyl-β-D-ribofuranosyl]-purines Repeating the procedure of Example 13 but replacing chloromercury-6-chloropurine with the mercury salts of hypoxanthine, $N^6$ - benzoyl - 7 - deazaadenine, $N^2$ - acetyl - 7 - deazaguanine, $N^6$ - benzoyladenine, $N^2$ - acetylguanine, xanthine, 2,6 - dichloropurine, $N^6$ - benzoyl - 8-azaadenine, $N^6$ - benzoyl - 2 - fluoroadenine, $N^2$ - acetamido - 6 - chloropurine, $N^2$ - acetyl - 8 - azaguanine, 2,6-dibenzamidopurine, yields the corresponding 9-[2-O-acetyl-3-deoxy-5-O-(p-nitrobenzoyl)-3-nitromethyl-β-D-ribofuranosyl]-hypoxanthine, 9-[2-O-acetyl-3-deoxy-5-O-(p-nitrobenzoyl)-3-nitromethyl-β-D-ribofuranosyl]-$N^6$-benzoyl-7-deazaadenine, $N^2$-acetyl-9-[2-O-acetyl-3-deoxy-5-O-(p-nitrobenzoyl)-3-nitromethyl-β-D-ribofuranosyl]-7-deazaguanine, 9-[2-O-acetyl-3-deoxy-5-O-(p-nitrobenzoyl)-3-nitromethyl-β-D-ribofuranosyl]-$N^6$-benzoyladenine, $N^2$-acetyl-9-[2-O-acetyl-3-deoxy-5-O-(p-nitrobenzoyl)-3-nitromethyl-β-D-ribofuranosyl]guanine, 9-[2-O-acetyl-3-deoxy-5-O-(p-nitrobenzoyl)-3-nitromethyl-β-D-ribofuranosyl]-xanthine, 2,6-dichloro-9-[2-O-acetyl-3-deoxy-5-O-(p-nitrobenzoyl)-3-nitromethyl-β-D-ribofuranosyl]-purine, 9-[2-O-acetyl-3-deoxy-5-O-(p-nitrobenzoyl)-3-nitromethyl-β-D-ribofuranosyl]-$N^6$-benzoyl-8-azaadenine, $N^6$-benzoyl-9-[2-O-acetyl-3-deoxy-5-O-(p-nitrobenzoyl)-3-nitromethyl-β-D-ribofuranosyl]-$N^6$-benzoyl-2-fluoroadenine, $N^2$-acetamido-6-chloro-9-[2-O-acetyl-3-deoxy-5-O-(p-nitrobenzoyl)-3-nitromethyl-β-D-ribofuranosyl)-purine, $N^2$-acetyl-9-[2-O-acetyl-3-deoxy-5-O-(p-nitrobenzoyl)-3-nitromethyl-β-D-ribofuranosyl]-8-azaguanine, and 9-[2-O-acetyl-3-deoxy-5-O-(p-nitrobenzoyl)-3-nitromethyl-β-D-ribofuranosyl]2,6-dibenzamidopurine, respectively.

EXAMPLE 15

1-[2-O-acetyl-3-deoxy-5-O-(p-nitrobenzoyl)-3-nitromethyl-β-D-ribofuranosyl]uracil 2 - O - acetyl - 3 - deoxy - 5 - O - (p - nitrobenzoyl)-3 - nitromethyl - D - ribofuranosyl chloride (0.5 mmole) is dissolved in 20 ml. of nitromethane, and bis-trimethylsilyluracil (300 mg., 0.5 mmole) and mercuric chloride (135 mg., 0.5 mmole) are added. The suspension is stirred at 20° C. for 48 hours. The reaction mixture is evaporated to dryness, and the residue is dissolved in chloroform. The solution is washed with aqueous solutions of sodium bicarbonate, sodium iodide and sodium thiosulate and finally with water. The chloroform layer is dried over magnesium sulfate and evaporated to dryness. The residue is purified by chromatography on silicic acid, eluting with chloroform-acetone (2:1). Evaporation of the pooled major peak yields 1-[2-O-acetyl-3-deoxy-5-O-(p - nitrobenzoyl) - 3 - nitromethyl - β - D - ribofuranosyl]-uracil.

EXAMPLE 16

Other 1-[2-O-acetyl-3-deoxy-5-O-(p-nitrobenzoyl)-3-nitromethyl-β-D-xylofuranosyl]-pyrimidines Repeating the procedure of Example 15 but replacing bis-trimethylsilyluracil with the following compounds (prepared as described in the above preparation)

$N^4$-acetyl-bis-trimethylsilyl-cytosine,
5-bromo-bis-trimethylsilyluracil,
$N^4$-acetyl-5-bromo-bis-trimethylsilylcytosine,
5-chloro-bis-trimethylsilyluracil,
$N^4$-acetyl-5-chloro-bis-trimethylsilylcytosine,
5-iodo-bis-trimethylsilyluracil,
$N^4$-acetyl-5-iodo-bis-trimethylsilylcytosine,
5-fluoro-bis-trimethylsilyluracil,
$N^4$-acetyl-5-fluoro-bis-trimethylsilylcytosine,
bis-trimethylsilylthymine,
$N^4$-acetyl-bis-trimethylsilyl-5-methylcytosine,
5-trifluoromethyl-bis-trimethylsilyluracil,
$N^4$-acetyl-5-trifluoromethyl-bis-trimethylsilylcytosine,
5-trimethylsilyloxy-bis-trimethylsilyluracil,
bis-trimethylsilyl-6-azauracil,
$N^4$-acetyl-bis-trimethylsilyl-6-azacytosine, and
bis-trimethylsilyl-6-azathymine yields the corresponding 1-[2-O-acetyl-3-O-deoxy-5-O-(p-nitrobenzoyl)-3-nitromethyl-β-D-ribofuranosyl]-$N^4$-acetylcytosine,
1-[2-O-acetyl-3-O-deoxy-5-O-(p-nitrobenzoyl)-3-nitromethyl-β-D-ribofuranosyl]-5-bromouracil,
1-[2-O-acetyl-3-O-deoxy-5-O-(p-nitrobenzoyl)-3-nitromethyl-β-D-ribofuranosyl]-$N^4$-acetyl-5-bromocytosine,
1-[2-O-acetyl-3-O-deoxy-5-O-(p-nitrobenzoyl)-3-nitromethyl-β-D-ribofuranosyl]-5-chlorouracil,
1-[2-O-acetyl-3-O-deoxy-5-O-(p-nitrobenzoyl)-3-nitromethyl-β-D-ribofuranosyl]-$N^4$-acetyl-5-chlorocytosine,
1-[2-O-acetyl-3-O-deoxy-5-O-(p-nitrobenzoyl)-3-nitromethyl-β-D-ribofuranosyl]-5-iodouracil,
1-[2-O-acetyl-3-O-deoxy-5-O-(p-nitrobenzoyl)-3-nitromethyl-β-D-ribofuranosyl]-$N^4$-acetyl-5-iodocytosine,
1-[2-O-acetyl-3-O-deoxy-5-O-(p-nitrobenzoyl)-3-nitromethyl-β-D-ribofuranosyl]-5-fluorouracil,
1-[2-O-acetyl-3-O-deoxy-5-O-(p-nitrobenzoyl)-3-nitromethyl-β-D-ribofuranosyl]-$N^4$-acetyl-5-fluorocytosine,
1-[2-O-acetyl-3-O-deoxy-5-O-(p-nitrobenzoyl)-3-nitromethyl-β-D-ribofuranosyl]-thymine,
1-[2-O-acetyl-3-O-deoxy-5-O-(p-nitrobenzoyl)-3-nitromethyl-β-D-ribofuranosyl]-$N^4$-acetyl-5-methylcytosine,
1-[2-O-acetyl-3-O-deoxy-5-O-(p-nitrobenzoyl)-3-nitromethyl-β-D-ribofuranosyl]-5-trifluoromethyluracil,
1-[2-O-acetyl-3-O-deoxy-5-O-(p-nitrobenzoyl)-3-nitromethyl-β-D-ribofuranosyl]-$N^4$-acetyl-5-trifluoromethylcytosine,
1-[2-O-acetyl-3-O-deoxy-5-O-(p-nitrobenzoyl)-3-nitromethyl-β-D-ribofuranosyl]-5-hydroxyuracil,
1-[2-O-acetyl-3-O-deoxy-5-O-(p-nitrobenzoyl)-3-nitromethyl-β-D-ribofuranosyl]-6-azauracil,
1-[2-O-acetyl-3-O-deoxy-5-O-(p-nitrobenzoyl)-3-nitromethyl-β-D-ribofuranosyl]-$N^4$-acetyl-6-azacytosine, and
1-[2-O-acetyl-3-O-deoxy-5-O-(p-nitrobenzoyl)-3-nitromethyl-β-D-ribofuranosyl]-6-azathymine, respectively.

EXAMPLE 17

9-(3-deoxy-3-nitromethyl-β-D-ribofuranosyl)-6-dimethylamino purine

The product of Example 15 (520 mg., 1 mmole) is dissolved with stirring in a 40 percent aqueous solution of dimethylamine (20 ml.) and kept for one hour at room temperature. Evaporation of the solvent, neutralization with acetic acid and treatment with methanol gives a crystalline precipitate of 9-(3-deoxy-3-nitromethyl-β-D-ribofuranosyl)-6-dimethylaminopurine.

EXAMPLE 18

Other 6-substituted amino-9-(3-deoxy-3-nitromethyl-β-D-ribofuranosyl)-purines

Repeating the procedure of Example 17 at a temperature and for a time sufficient for completing the reaction as followed by thin layer chromatography and UV but replacing dimethylamine with ethanolic solutions of di-n-propylamine, dimethylallylamine, piperidine, aziridine, and morpholine yields the corresponding 9-(3-deoxy-3-nitromethyl-β-D-ribofuranosyl)-6-di-(n-propyl)-aminopurine,
9-(3-deoxy-3-nitromethyl-β-D-ribofuranosyl)-6-dimethylallylaminopurine,
9-(3-deoxy-3-nitromethyl-β-D-ribofuranosyl)-6-piperidinopurine,
6-aziridino-9-(3-deoxy-3-nitromethyl-β-D-ribofuranosyl)-purine, and
9-(3-deoxy-3-nitromethyl-β-D-ribofuranosyl)-6-morpholinopurine, respectively.

If necessary to complete deacylation, the product is treated with saturated methanolic ammonia at room temperature for 30 minutes prior to the chromatography step.

EXAMPLE 19

9 - (3-deoxy-3-nitro-methyl-β-D-ribofuranosyl)-6-methylaminopurine, and 2,6-dimethylaminopurine, 1-(3-deoxy-3-nitromethyl-β-D-ribofuranosyl) - 5 - aminouracil and 5-methylaminouracil 9-[2-O-acetyl - 3 - deoxy-5-O-(p-nirtobenzoyl)-3-nitromethyl-β-D-ribofuranosyl]-6-chloropurine (0.5 g.) is dissolved in anhydrous methylamine and heated in a stainless steel bomb at 80° C. for 18 hours. After evaporation of the solvent, the residue is purified by chromatography on a column of silicic acid followed by crystallization to yield 9-(3-deoxy-3-nitromethyl - β - D - ribofuranosyl)-6-methylaminopurine. Repeating this procedure with the corresponding 2,6-dichloropurine yields the 2,6-dimethylaminopurine compound.

Repeating the above procedure replacing 9-[2-O-acetyl-3-deoxy - 5 - O - (p-nitrobenzoyl)-3-nitromethyl-β-D-ribofuranosyl]-6-chloropurine with 1-[2-O-acetyl - 3 - deoxy-5-O-(p-nitrobenzoyl) - 3 - nitromethyl - β - D-ribofuranosyl]-5-bromouracil yields 1-(3-deoxy - 3 - nitromethyl-β-D-ribofuranosyl)-5-methylaminouracil.

Repeating the latter procedure but replacing methylamine with anhydrous ammonia yields the corresponding 5 - amino - 1 - (3-deoxy-3-nitromethyl-β-D-ribofuranosyl)-uracil.

EXAMPLE 20

9-(3-aminomethyl-3-deoxyl-β-D-ribofuranosyl)-6-dimethylaminopurine

The product of Example 17 (338 mg., 1 mmole) is suspended in methanol (80 ml.) and hydrogenated in the presence of prereduced 10 percent palladium on charcoal catalyst (500 mg.). After uptake of the theoretical amount of $H_2$ (75 ml.), the catalyst is filtered off, washed well with methanol and the combined methanolic solutions are evaporated to give 9-(3-aminomethyl-3-deoxy-β-D-ribofuranosyl)-6-dimethylaminopurine.

EXAMPLE 21

Other 9 - (3 - aminomethyl-3-deoxy-β-D-ribofuranosyl)-purines and 1 - (3 - aminomethyl-3-deoxy-β-D-ribofuranosyl)-pyrimidines The procedure of Example 20 is repeated replacing 9-(3 - deoxy - 3 - nitromethyl-β-D-ribofuranosyl)-6-dimethylaminopurine with the deacylated products of Examples 13 and 14, the products of Example 18 and the purine products of Example 19. The deacylation is effected by treating the acyl compound with methanolic ammonia at room temperature for 30 minutes and purification by chromatography. With 6-chloropurine compounds, the reaction is stopped when the theoretical amount of hydrogen is consumed. This procedure yields the corresponding 9 - (3-aminomethyl-3-deoxy-β-D-ribofuranosyl)-purines wherein the purine group is, respectively, 6-chloropurine, hypoxanthine, 7-deazaadenine, 7-deazaguanine, adenine, guanine, xanthine, 2,6 - dichloropurine, 8-azaadenine, 2 - fluoroadenine, 2 - amino - 6-chloropurine, 8-azaguanine, 2,6-diaminopurine, 2,6 - dimethylaminopurine, 6 - di-(n-propyl)-aminopurine, 6-dimethylallylaminopurine, 6 - piperidinopurine, 6-aziridinopurine, 6 - morpholinopurine, 6 - methylaminopurine, and 6-aminopurine.

Repeating the procedure of Example 20 but replacing 9 - (3-deoxy-3-nitromethyl-β-D-ribofuranosyl) - 6 - dimethylaminopurine with the products of Examples 15 and 16 (deacylated as described above) and the pyrimidine products of Example 19 yields the corresponding 1-(3-aminoethyl-3-deoxy-β-D-ribofuranosyl)-pyrimidine bases wherein the pyrimidine bases include, uracil, cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5 - methylcytosine, 5 - trifluoromethyluracil, 5-trifluoromethylcytosine, 5-aminouracil, 5-aminocytosine, 5 - methylaminouracil, 5 - methylaminocytosine, 5-hydroxyuracil, 6-azauracil, 6-azacytosine, and 6-azathymine.

EXAMPLE 22

9-(3-aminomethyl-3-deoxy-β-D-ribofuranosyl)-6-mercaptopurine and 6-thioquanine

9 - (2 - O - acetyl-3-aminomethyl-3-deoxy-β-D-ribofuranosyl)-6-chloropurine (300 mg.) and 100 mg. of thiourea are dissolved in absolute ethanol (8 ml.) and heated under reflux for 1 hour. The mixture is evaporated to dryness and purified by chromatography on silicic acid to give 9-(3-aminomethyl-3-deoxy-β-D-ribofuranosyl)-6-mercaptopurine.

Repeating the above procedure with 2-acetamido-9-(2-O-acetyl-3-aminomethyl-3-deoxy-β-D - ribofuranosyl)-6-chloropurine followed by treatment under nitrogen with concentrated ammonium hydroxide prior to chromatography (to remove the $N^2$-acetyl group) yields the corresponding 9-(3-aminomethyl-3-deoxy-β-D-ribofuranosyl)-thioguanine.

EXAMPLE 23

9-(3-aminomethyl-3-deoxy-β-D-ribofuranosyl)-6-methylmercaptopurine and 2-amino-6-methylmercaptopurine Methyl iodide (1 ml.) and 9-(3-aminomethyl-3-deoxy-β-D-ribofuranosyl) - 6 - mercaptopurine (300 mg.) is dissolved in ethanol (10 ml.), and the mixture is stirred at room temperature for 4 hours while dilute methanolic sodium hydroxide is added to maintain a slightly alkaline pH. The solvent is then evaporated, and the residue purified by chromatography to yield 9-(3-aminomethyl-3-deoxy-β-D-ribofuranosyl)-6-methylmercaptopurine.

Repeating the above procedure with 9-(3-aminomethyl-3-deoxy-β-D-ribofuranosyl)-thioguanine yields the corresponding 2-amino-9-(3-aminomethyl - 3 - deoxy-β-D-ribofuranosyl)-6-methylmercaptopurine.

EXAMPLE 24

9-(3-aminomethyl-3-deoxy-β-D-ribofuranosyl)-6-hydroxylaminopurine

9 - (3 - aminomethyl - 3-deoxy-β-D-ribofuranosyl)-6-chloropurine (338 mg.) is dissolved in 10 ml. of a 0.5 M ethanolic solution of hydroxylamine (prepared as in J. Am. Chem. Soc. 80, 3932) and kept at 50° C. for 6 hours. The mixture is then evaporated and purified by chromatography on silicic acid to yield 9-(3-aminomethyl - 3 - deoxy-β-D-ribofuranosyl) - 6 - hydroxylaminopurine.

EXAMPLE 25

9-[3-deoxy-3-(L-p-methoxyphenylalanylaminomethyl)-β-D-ribofuranosyl]-6-dimethylaminopurine To an ice-cooled solution of triethylamine (0.3 ml.) in 6 ml. of dimethylformamide is added N-carbobenzoxy-p-methoxy-L-phenylalanine (500 mg., 1.5 mmoles) and 0.2 ml. of ethylchloroformate. After 10 minutes, a solution of 9 - (3-aminomethyl-3-deoxy-β-D-ribofuranosyl) - 6 - dimethylaminopurine (308 mg., 1 mmole) in dimethylformamide (10 ml.) containing triethylamine (0.3 ml.) is added, and the reaction mixture is held for 24 hours with exclusion of moisture. Addition of water (3 ml.) followed by evaporation yields crude 9-[3-deoxy-3 - (N - carbobenzoxy-L-p-methoxyphenylalanylaminomethyl) - β - D - ribofuranosyl] - 6 - dimethylaminopurine which is purified by preparative thin layer chromatography.

This compound (315 mg., 0.5 mmoles) is added to a prehydrogenated suspension of 10 percent palladium-on-charcoal (1.0 g.) in methanol (100 ml.) and stirred in an atmosphere of hydrogen. After 4 hours, the catalyst is filtered off, washed well with methanol, and the methanolic solution is evaporated to yield 9-[3-deoxy-3-(L-p-methoxyphenylalanylaminomethyl) - β - D - ribofuranosyl]6-dimethylaminopurine.

EXAMPLE 26

Other 3'-acylamidomethyl-3'-deoxy-β-D-ribofuranosides

Repeating the procedure of Example 25 but replacing N-carbobenzoxy-p-methoxy-L-phenylalanine with N-carbobenzoxy glycine, N-carbobenzoxy alanine, N-carbobenzoxy valine, N-carbobenzoxy leucine, N-carbobenzoxy isoleucine, N-carbobenzoxy phenylalanine, N-carbobenzoxy) serine, N-carbobenzoxy threonine, N-carbobenzoxy tyrosine, N-carbobenzoxy proline, N-carbobenzoxy aspartic acid β-benzyl ester, N-carbobenzoxy glutamic acid β-benzyl ester, N,N'-dicarbobenzoxy lysine, N,N'-dicarbobenzoxy histidine, N-carbobenzoxy N'-nitroarginine, N,N'-dicarbobenzoxy tryptophane yields the corresponding 9-[3-deoxy-3-(L-glycylamidomethyl)-β-D-ribofuranosyl]-6-dimethylaminopurine, 9-[3-(L-alanylamidomethyl)-3-deoxy-β-D-ribofuranosyl]-6-dimethylaminopurine, 9-[3-deoxy-3-(L-valylamidomethyl)-β-D-ribofuranosyl]-6-dimethylaminopurine, 9-[3-deoxy-3-(L-leucylamidomethyl)-β-D-ribofuranosyl]-6-dimethylaminopurine, 9-[3-deoxy-3-(L-isoleucylamidomethyl)-β-D-ribofuranosyl]-6-dimethylaminopurine, 9-[3-deoxy-3-(L-phenylalanylamidomethyl)-β-D-ribofuranosyl]-6-dimethylaminopurine, 9-[3-deoxy-3-(L-serylamidomethyl)-β-D-ribofuranosyl]-6-dimethylaminopurine, 9-[3-deoxy-3-(L-threonylamidomethyl)-β-D-ribofuranosyl]-6-dimethylaminopurine, 9-[3-deoxy-3-(L-tyrosylamidomethyl)-β-D-ribofuranosyl]-6-dimethylaminopurine, 9-[3-deoxy-3-(L-prolylamidomethyl)-β-D-ribofuranosyl]-6-dimethylaminopurine, 9-[3-(L-aspartylamidomethyl)-3-deoxy-D-ribofuranosyl]-6-dimethylaminopurine, 9-[3-deoxy-3-(L-glutamylamidomethyl)-β-D-ribofuranosyl]-6-dimethylaminopurine, 9-[3-deoxy-3-(L-lysylamidomethyl)-β-D-ribofuranosyl]-6-dimethylaminopurine, 9-[3-deoxy-3-(L-histidylamidomethyl)-β-D-ribofuranosyl]-6-dimethylaminopurine, 9-[3-(L-arginylamidomethyl)-3-deoxy-β-D-ribofuranosyl]-6-dimethylaminopurine, and 9-[3-deoxy-3-(L-tryptophylamidomethyl)β-D-ribofuranosyl]-6-dimethylaminopurine respectively.

Repeating the above procedure and the procedure of Example 25 but replacing 9-(3-aminomethyl-3-deoxy-β-D-ribofuranosyl)-6-dimethylaminopurine with the products of Example 21 and Example 24 yields the corresponding 9-(3 - acylamidomethyl - 3 - deoxy-β-D-ribofuranosyl)-purines and 1-(3-acylamidomethyl-3-deoxy-β-D-ribofuranosyl)-pyrimidines.

EXAMPLE 27

9-(3-deoxy-3-N-methionylaminomethyl-β-D-ribofuranosyl)-6-dimethylaminopurine

A mixture of 9-(3-aminomethyl-3-deoxy-β-D-ribofuranosyl)-6-dimethylaminopurine (616 mg., 2 mmole), the N-hydroxysuccinimide ester of N-t-butoxy-carbonyl-L-methionine (1.04 g., 3 m.) perpared as described in J. Amer. Chem. Soc. 86, 1839) and sodium bicarbonate (168 mg.) is stirred in aqueous ethanol (25 ml.) for 18 hours. The solvent is evaporated, and the residue partitioned between ethyl acetate and water. The organic phase is evaporated, and the t-butoxy carbonyl group is removed by treatment with trifluoroacetic acid at room temperature for 1 hour to yield 9-(3-deoxy-3-N-methionylaminomethyl-β-D-ribofuranosyl)-6-dimethylaminopurine which is purified by chromatography on silicic acid.

Repeating this procedure but replacing 9-(3-aminomethyl-3-deoxy-β-D-ribofuranosyl) - 6 - dimethylaminopurine with the products of Examples 21, 22, 23 and 24 yields the corresponding 9-(3-deoxy-3-N-methionylaminomethyl-β-D-ribofuranosyl)-purines and 1 - (3-deoxy-3-N-methionylaminomethyl-β-D-ribofuranosyl)-pyrimidines.

Repeating the above procedures but replacing the hydroxysuccinimide ester of N-t-butoxycarbonyl-L-methionine with the hydroxysuccinimide ester of other neutral amino acids yields the corresponding 9-(3-deoxy-3-acylamidomethyl-β-D-ribofuranosyl)-purines and 1-(3-deoxy-3-acylamidomethyl-β-D-ribofuranosyl)-pyrimidines.

We claim:

1. A compound selected from the group of compounds represented by the formulas

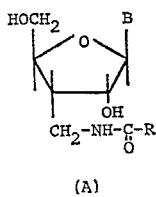 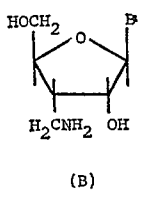

(A) (B)

wherein

is an acyl group selected from the group consisting of p-methoxyphenylalanyl, glycyl, alanyl, valyl, leucyl, isoleucyl, phenylalanyl, seryl, threonyl, tyrosyl, prolyl, aspartyl, glutamyl, lysyl, histidyl, arginyl, tryptophyl and methionyl, and B is a pyrimidine or purine base or a hydrolyzable acyl derivative thereof derived from a carboxylic acid having from 1 to 12 carbons.

2. A compound of claim 1 wherein B is selected from the group consisting of uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthin-9-yl, 9-deazaadenin-9-yl, 7-deazaguanin-9-yl, adenin-9-yl, 6-chloropurin-9-yl, 6-mercaptopurin-9-yl, 6-methylmercaptopurin-9-yl, guanin-9-yl, xanthin-9-yl, 2,6-dichloropurin-9-yl, 2,6-dimethylaminopurin-9-yl, 2,6-diaminopurin-9-yl, 8-azaadenin-9-yl, thioguanin-9-yl, 2-fluoroadenin-9-yl, 6-hydroxyaminopurin-9-yl, 2-amino-6-methylmercaptopurin-9-yl, 8-azaguanin-9-yl, and 6-substituted purin-9-yl compounds which can be represented by the formula

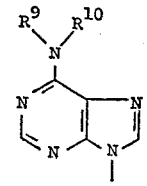

wherein $R^9$ and $R^{10}$ each is hydrogen, lower alkyl, or 3'',3''-dimethylallyl, or $R^9$ and $R^{10}$ together —$(CH_2)_n$ wherein $n$ is an integer of from 2 to 6 or $R^9$ and $R^{10}$ together with the nitrogen to which they are attached are morpholino.

3. A compound of claim 1 selected from the group of compounds represented by Formula A.

4. A compound of claim 3 wherein B is a 6-dimethylaminopurine group.

5. A compound of claim 3 wherein B is a 6-dipropylaminopurine group.

6. A compound of claim 3 wherein B is a 6-diethylaminopurine group.

7. A compound of claim 3 wherein B is a 6-dibutylaminopurine group.

8. A compound of claim 3 wherein B is a 6-dipentylaminopurine group.

9. A compound of claim 3 wherein B is adenine.

10. A compound of claim 1 selected from the group of compounds represented by Formula B.

11. A compound of claim 10 wherein B is a 6-dimethylaminopurine group.

12. A compound of claim 10 wherein B is a 6-dipropylaminopurine group.

13. A compound of claim 10 wherein B is a 6-diethylaminopurine group.

14. A compound of claim 10 wherein B is a 6-dibutylaminopurine group.

15. A compound of claim 10 wherein B is a 6-dipentylaminopurine group.

16. A compound of claim 10 wherein B is adenine.

17. A compound selected from the group of compounds represented by the formula

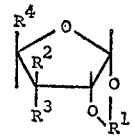

(C)

wherein $R^1$ is an alkylidene group having from 1 to 8 carbons or a cycloalkylidene group having up to 8 carbons;

one of $R^2$ and $R^3$ is hydroxy and the other is nitromethyl; and
$R^4$ is $H_2COR^5$ or

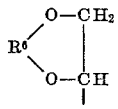

wherein $R^5$ is a hydrolyzable acyl group derived from a carboxylic acid having from 1 to 12 carbons and $R^6$ is an alkylidene group having from 1 to 8 carbons or a cycloalkylidene group having up to 8 carbons.

18. A compound selected from the group of compounds represented by the formula

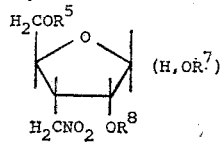

(D)

wherein
$R^5$ is a hydrolyzable acyl group derived from a carboxylic acid having from 1 to 12 carbons; and
$R^7$ and $R^8$ both are a lower aliphatic hydrocarbon acyl group.

References Cited
UNITED STATES PATENTS 2,830,984  4/1958  Baker et al. _____ 260—211.5 R LEWIS GOTTS, Primary Examiner J. R. BROWN, Assistant Examiner U.S. Cl. X.R.

260—209 R, 211.5 R, 999